United States Patent [19]

Nakata et al.

[11] Patent Number: 4,573,154
[45] Date of Patent: Feb. 25, 1986

[54] DATA COMMUNICATION SYSTEM WITH ERROR DETECTION/CORRECTION

[75] Inventors: Yukio Nakata, Kawasaki; Osamu Shiotsu, Asaka, both of Japan

[73] Assignee: Hitachi, Ltd., Tokyo, Japan

[21] Appl. No.: 538,510

[22] Filed: Oct. 3, 1983

[30] Foreign Application Priority Data

Oct. 8, 1982 [JP] Japan ................. 57-176299

[51] Int. Cl.[4] .............................................. H04L 1/14
[52] U.S. Cl. ..................................................... 371/34
[58] Field of Search .............. 371/34, 37; 340/825.03, 340/825.04, 825.06, 825.07

[56] References Cited

U.S. PATENT DOCUMENTS

| | | | |
|---|---|---|---|
| 3,336,576 | 8/1967 | Sourgens | 371/34 |
| 3,735,351 | 5/1973 | Macheel | 371/37 |
| 3,796,994 | 3/1974 | Nuss, Jr. | 371/34 |
| 3,995,258 | 11/1976 | Barlow | 364/200 |
| 4,162,483 | 7/1979 | Entenman | 371/37 X |
| 4,254,499 | 3/1981 | Yoshikane | 371/34 X |
| 4,454,601 | 6/1984 | Helms et al. | 371/34 |

Primary Examiner—Charles E. Atkinson
Attorney, Agent, or Firm—Antonelli, Terry & Wands

[57] ABSTRACT

In a data communication system which has a common transmission line, a plurality of transceivers connected to the transmission line and data processors connected to the respective transceivers, and in which data from the data processor is delivered to the common transmission line through the corresponding transceiver, and data from the common transmission line is delivered to the data processor through the transceiver, so as to perform data communications among the data processors; a data communication system wherein said each transceiver comprises a first circuit which checks if an address of the data received from the transmission line has been received without any transmission error, a second circuit which checks if the address is one directed to the particular transceiver when the absence of the transmission error has been decided by the first circuit, a third circuit which turns back and delivers the received data when the address directed to the particular transceiver has been decided by the second circuit, and a fourth circuit which compares the sent data with the data turned back from another transceiver, the sending of the data being stopped when disagreement has been detected by the fourth circuit.

5 Claims, 7 Drawing Figures

DATA COMMUNICATION SYSTEM WITH ERROR DETECTION/CORRECTION

BACKGROUND OF THE INVENTION

The present invention relates to a data communication method and apparatus which perform the communications of data among processors, such as terminals and computers.

With the spread of private decentralized processing, a data communication system in which a large number of terminals and computers communicate with one another has come into wide use.

A data communication system, as shown in FIG. 1 has heretofore been known (Japanese Laid-open Patent Application No. 51-114804).

Using a coaxial cable 101 as a transmission line, the signals of the coaxial cable 101 are led to a terminal 105 and a computer 106 through transceivers 102, signal lines 103 and connectors 104, whereby data communications are carried out between the terminal 105 and the computer 106.

FIG. 2 shows the interface between the transceiver and the terminal or computer (hereinbelow, termed "processor" or data treating device) in FIG. 1. Referring to FIG. 2, a carrier sensing line 103-1 becomes "1" when a transceiver on the coaxial cable 101, not corresponding to the particular processor, is sending data, and it becomes "0" when not. A contention detecting line 103-2 becomes "1" when, during the data sending of the processor 105, a transceiver not corresponding to the particular processor has simultaneously sent data, and it becomes "0" when not. Using a data sending line 103-3, the processor 105 sends data. In addition, the processor 105 receives data by the use of a data receiving line 103-4.

With this interface, the prior-art system transmits data as described below.

The processor 105 starts sending data through the data sending line 103-3, subject to the carrier sensing line 103-1 being "0". The data is delivered to the coaxial cable 101 by the transceiver 102. The data is transmitted along the coaxial cable 101 with a propagation delay, and is received by a transceiver not corresponding to the particular processor. This transceiver brings the carrier sensing line to "1", to indicate that the coaxial cable 101 is occupied. However, in a case where, even after the transceiver 102 has started sending the data, the carrier sensing line of a transceiver not corresponding to the particular processor is still "0" on account of the propagation delay, the processor connected to this transceiver might start sending data. In this case, the transceiver 102 detects a contention and brings the contention detecting line 103-2 to "1". When the contention detecting line 103-2 has become "1", the processor 105 interrupts the sending of the data. Upon lapse of a time generated with a random number, it starts the sending of the same data again after detecting that the carrier sensing line is "0".

Since such system does not include means for acknowledging that the data sent from the transceiver has arrived at the transceiver in an intended receiving station without any error, the processor of the intended receiving station needs to send acknowledge data to the processor of the sending station by the use of the same transmission line in order to communicate the correct arrival of the data. This has led to the problem that the possibility of a contention due to the acknowledge data increases.

In addition, the processor of the intended receiving station sends the acknowledge data after having received all the data, and the processor on the sending side can acknowledge the arrival of the data at the intended receiving station upon receiving the acknowledge data. This has led to the problem that a delay corresponding to an acknowledge data receiving time extends from the end of the sending to the arrival of the acknowledgement.

Moreover, the sending side processor usually monitors the reception of the acknowledge data with a timer after having sent the data. In a case where the data has not properly arrived at the intended receiving station on account of a transmission error and where the acknowledge data is not received back, the processor re-sends the data after a time-out. Herein, a timer value needs to be longer than the period of time in which the acknowledge data is properly received after the end of the sending. This has led to the problem that, after the development of the transmission error, a long time is taken before the re-sending can be started.

SUMMARY OF THE INVENTION

An object of the present invention is to provide, in a system wherein a plurality of processors perform data communications with one another by the use of a common transmission line, a data communication system in which the processor can acknowledge if data has properly arrived at the processor of an intended receiving station, in a short time and without increasing the possibility of contentions.

In order to accomplish such object, according to the present invention, a transceiver having sent data includes therein a circuit which checks the presence or absence of any transmission error of data received from a first transmission line, and a circuit which compares the address of the received data with an address peculiar to the transceiver, so that when the addresses have agreed, the subsequent received data is delivered to a second transmission line, while the transceiver having sent the data includes a circuit which compares data being sent to the first transmission line and data to be received from the second transmission line, bit by bit, so that the proper arrival of the data to an opposite transceiver can be judged while the values of both the bits are in agreement.

DETAILED DESCRIPTION OF THE PREFERRED EMBODIMENTS

Now, embodiments of the present invention will be described in detail with reference to the drawings.

Figure 1:
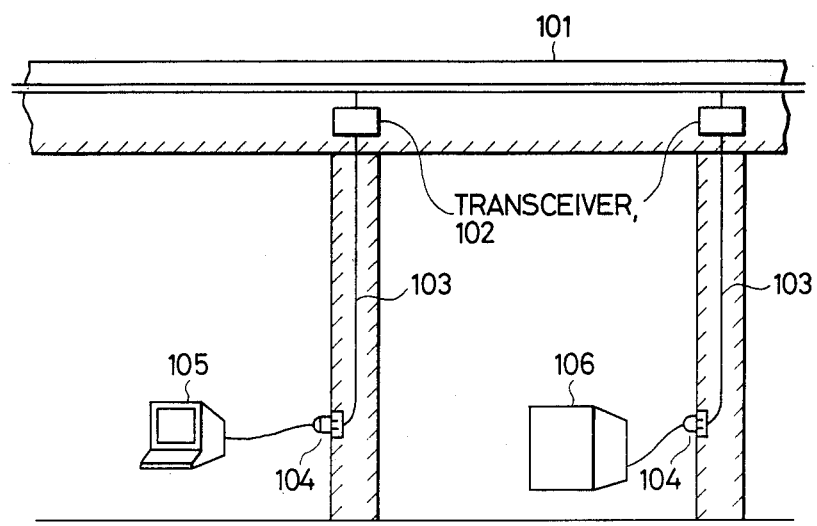
FIG. 1 is an arrangement diagram showing a data communication system in a prior art.
Figure 2:
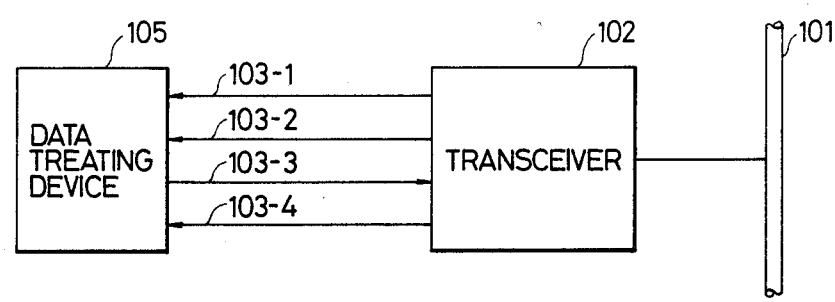
FIG. 2 is a diagram showing the interface between a processor and a transceiver in the prior-art data communication system.
Figure 3:
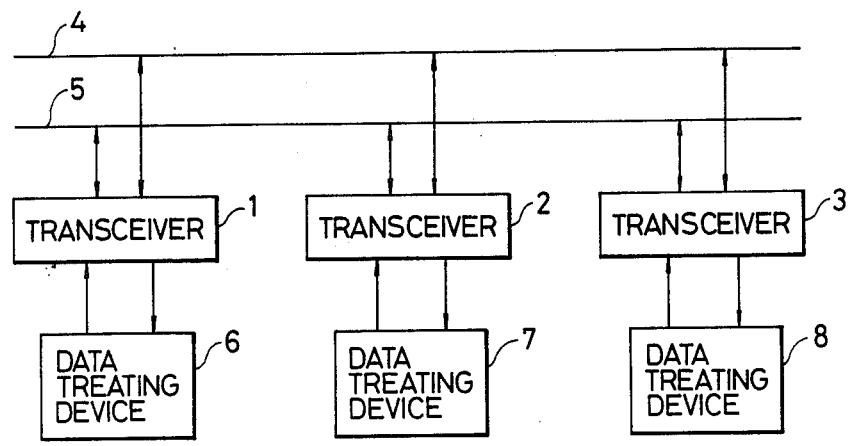
FIG. 3 is a block diagram showing an example of a data communication system according to the present invention.

FIG. 3 shows an embodiment of a data communication system according to the present invention.

Referring to the figure, transceivers 1, 2 and 3 are respectively connected to coaxial cables 4 and 5. The transceivers 1, 2 and 3 are respectively connected to data treating devices or processors 6, 7 and 8 each of which is a terminal, such as display terminal, or a computer.

In such arrangement, the transceivers 1-3 receive data sent from the connected processors 6-8 and send the data to the coaxial cable 4. In addition, the transceivers 1-3 receive sent data from the coaxial cable 4 and deliver that data to the processors 6-8.

Figure 4:
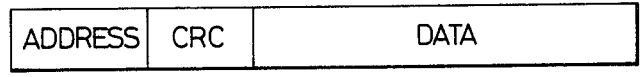
FIG. 4 is a diagram showing an example of the organization of data to be sent.

FIG. 4 shows the organization of data to be sent. Besides the essential data DATA, the data includes the address ADDRESS of an intended receiving station and the error check code CRC of the address. Each of the processors 6-8 receives only data directed thereto, and is thus capable of data communications with any of the processors.

Figure 5:
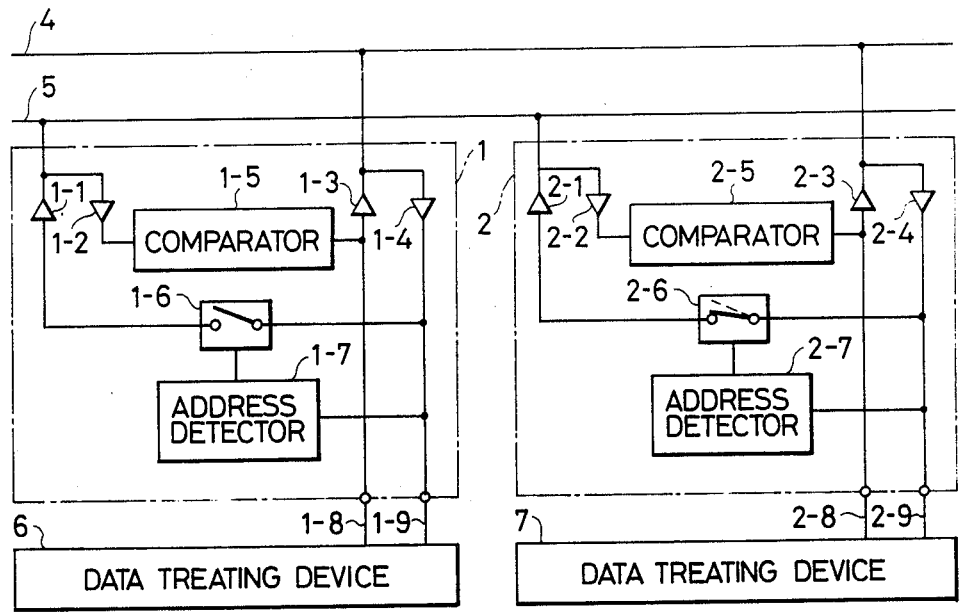
FIG. 5 is a conceptual diagram for explaining the operation of the present invention.

FIG. 5 is a diagram for explaining the operating principle of the transceivers in FIG. 3.

Referring to FIG. 5, an example will be first described where the processor 6 sends data to the processor 7 via the transceivers 1 and 2.

When the processor 6 sends an interface line 1-8 data with the address of the processor 7 added thereto, the transceiver 1 delivers the data to the coaxial cable 4 by the use of a driver 1-3. The data delivered to the coaxial cable 4 is received by the receiver 2-4 of the transceiver 2, and is supplied to the processor 7 via an interface line 2-9.

Meanwhile, the address detector 2-7 of the transceiver 2 examines the error check code and the address added at the head of the data. Upon detecting that the address has arrived without any transmission error and is of the processor 7, it sets a switch 2-6 in a connected state as indicated by a solid line. Then, the data received by the receiver 2-4 is delivered to the coaxial cable 5 by means of a turn-back driver 2-1.

The data delivered to the coaxial cable 5 is received by the receiver 1-2 of the transceiver 1.

The transceiver 1 compares the sent data from the interface line 1-8 and the data received by the receiver 1-2, bit-by-bit by the use of a data comparator 1-5. Unless any transmission error develops on the coaxial cables 4 and 5, the two inputs of the comparator 1-5 become equal values throughout the sending of the data, and the transceiver 1 can acknowledge that the data is properly arriving at the opposite transceiver 2.

The data comparator 1-5 has a built-in circuit which compensates a delay attributed to the fact that the data is transmitted via the two coaxial cables and the transceiver of the intended receiving station.

The receiver 1-4 of the transceiver 1 receives the data which the transceiver 1 is sending. Since, however, the address added to the data differs from that of the processor 6, the output of an address detector 1-7 is not generated. Accordingly, a switch 1-6 remains in an open state, and the receiver 1-2 is prevented from receiving the data, being sent by the transceiver 1 itself, via a driver 1-1 and thereby affecting the operation of the data comparator 1-5.

Also when a circuit is added which prevents the address detector 1-7 from operating while the processor 6 is sending data, the operation of the data comparator 1-5 can be prevented from being hampered, as described above.

The switch 2-6 of the transceiver 2 is reset into an open state again when the reception of the data has ended.

In the next place, there will be described operations in the case where the processors 6 and 7 have sent data at the same time.

The switches 1-6 and 2-6 of the transceivers 1 and 2 are respectively released in their initial states. The address detectors 1-7 and 2-7 are set so as not to perform the address detecting operations when the transceivers 1 and 2 are sending data.

When the processor 6 delivers data to the interface line 1-8, the data is delivered to the coaxial cable 4 by the driver 1-3. On the other hand, the processor 7 delivers data to an interface line 2-8 at substantially the same time, and the data is delivered to the coaxial cable 4 by a driver 2-3.

Now, even when an address added to the data sent from the processor 6 has arrived at the transceiver 2 without any transmission error and is of the processor 7, the transceiver 2 is sending, and hence, the address detector 2-7 does not operate, the switch 2-6 remaining in the released state, so that turn-back data does not come to the coaxial cable 5. Accordingly, the value of two inputs to the data comparator 1-5 of the transceiver 1 disagree, and it can be known that the contention of the data (otherwise, a transmission error) has occurred.

Also, when the address affixed to the data sent from the processor 6 is other than that of the processor 7, the address sent from the processor 6 and an address simultaneously sent from the processor 7 are superposed on the coaxial cable 4, so that the error check code of the address changes, and the address is not properly received by any transceiver. Accordingly, no data is turned back, and the transceiver 1 can know that the contention of the data has occurred.

In the above, let it be supposed that the address superposed on the coaxial cable 4 happens to be properly received by a transceiver other than transceivers 1 and 2 that this address is detected by the address detector and found to agree with the address of the processor, and that data is turned back to the coaxial cable 5 by the aforementioned other transceiver. Even in this case, since the data of the processors 6 and 7 following the addresses thereof are also superposed, the values of the two inputs to the data comparator 1-5 differs in the transceiver 1, and the transceiver 1 can detect the contention of the data anyway.

Meanwhile, as regards the data sent from the processor 7, operations similar to those thus far described are performed in the transceiver 2, and the contention of the data can be detected.

Even when the transceiver other than transceivers 1, 2 has properly recognized the superposed address and has delivered the received data to the corresponding processor, the transceivers 1, 2 stop the sending of data as soon as they detect the contention. Therefore, the abnormality of the received data can be detected on the receiving side.

Figure 6:
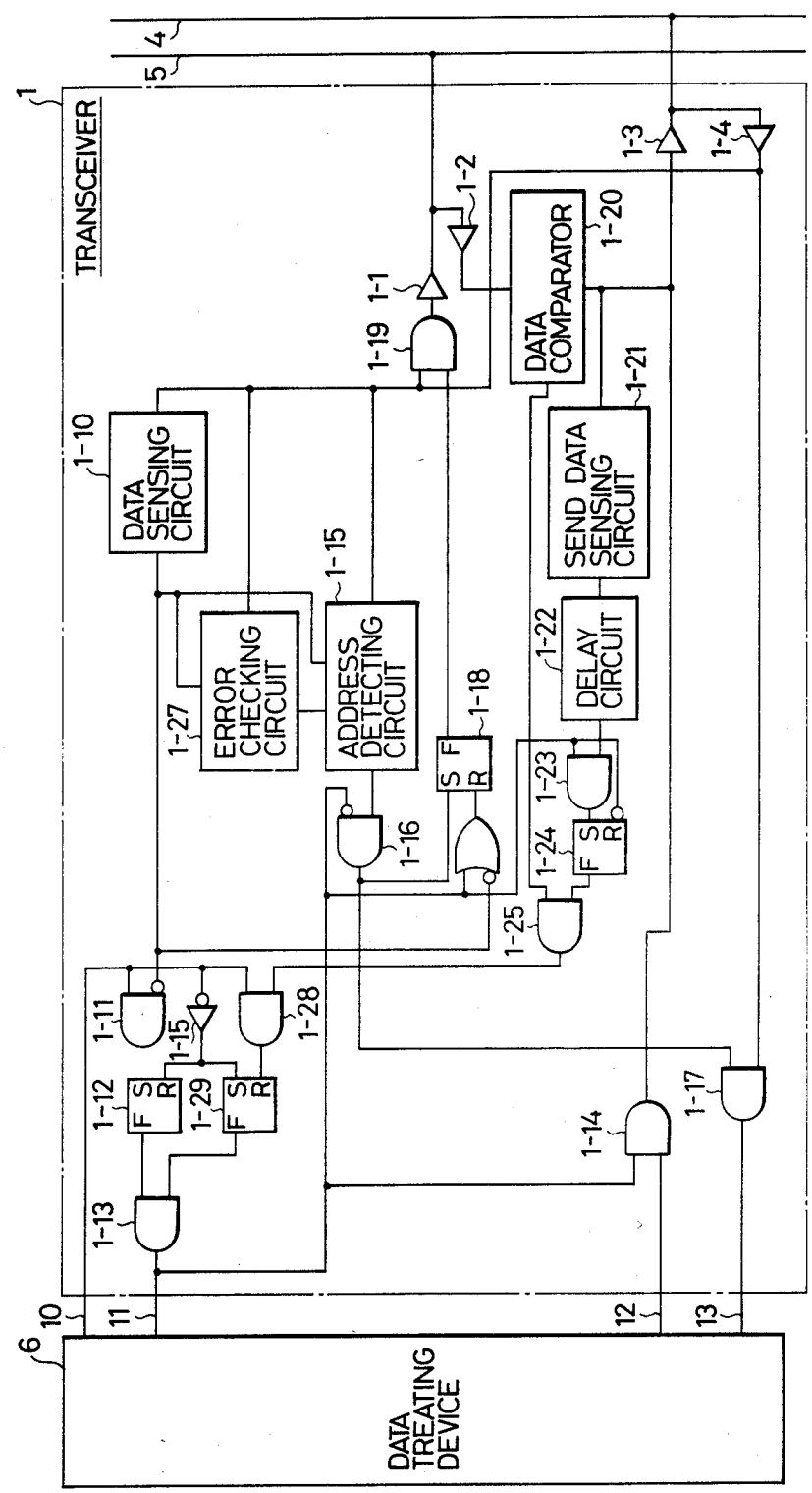
FIG. 6 is a diagram showing an example of the practicable arrangement of a transceiver portion in FIG. 3.

FIG. 6 exemplifies the practicable arrangement of each transceiver in FIG. 3 and the connection thereof with the data treating device or processor, such as a terminal. The transceiver has the function of detecting the transmission error of sent data, the function of detecting whether or not a common transmission line is occupied, and the function of detecting a contention when data have been simultaneously sent from at least two processors such as terminals.

Although FIG. 6 illustrates the example of the transceiver 1, it will be referred to also for describing the operations of the transceiver 2 later.

In FIG. 6, the interface lines between the processor 6 and the transceiver 1 will be first explained.

When the processor 6 intends to send data, it brings the signal of a send request line 10 to "1" ("on"). The transceiver 1 brings the signal of a send allowance line 11 to "1" subject to the conditions that the send request signal from the processor 6 is "1" and that the sending of data is possible as stated below.

While the send allowance signal is "1", the processor 6 delivers data to-be-sent (series of bits "1" and "0") to a send data line 12. The transceiver 1 actuates the driver 1-3 with the send data so as to deliver the data to the coaxial cable 4. Further, data to be received from the coaxial cable 4 is received by the receiver 1-4 and is put on a receive data line 13 so as to be delivered to the processor 6.

Next, the operations of sending and receiving data among the processors 6–8 will be described in detail as to a case where data is sent from the processor 6 to the processor 7.

The processors 6–8 have peculiar addresses, respectively. As shown in FIG. 4, the data to be sent from the processor 6 to the processor 7 has, at its head, the address ADDRESS peculiar to the processor 7 and the error check code CRC thereof, followed by the data DATA for one unit (termed "bucket").

The transceiver 1 examines the output of the receiver 1-4 shown in FIG. 6 by means of a data sensing circuit 1-10. In the absence of the output, that is, when another transceiver is not sending, it brings the output of the data sensing circuit 1-10 to "0" ("off"), whereas in the presence of the output of the receiver 1-4, that is, when another transceiver is sending, it brings the output of the data sensing circuit 1-10 to "1". Before sending the data, the processor 6 brings the signal of the send request line 10 to "1".

In the transceiver 1, if the send request signal is "1" and the output of the data sensing circuit 1-10 is "0", an AND gate 1-11 is enabled to set a flip-flop 1-12. Thus, an AND gate 1-13 is enabled to bring the signal of the send allowance line 11 to "1". Once the send allowance signal has been rendered "1" by the flip-flop 1-12, it remains at "1" until the send request signal subsequently becomes "0" or the contention of sending arises as described later, even in a case where the output of the data sensing circuit 1-10 has become "1" in such a manner that the receiver 1-4 has received the sent data of the transceiver 1 turned back by the coaxial cable 4.

At the same time that the send allowance signal is rendered "1" by the output of the AND gate 1-13, an AND gate 1-14 is enabled so as to permit the send data to be applied to driver 1-3.

Even when the send request signal is "1", if the output of the data sensing circuit 1-10 is "1", the AND gate 1-11 is disabled, and the send allowance signal is not rendered "1". Therefore, the processor 6 does not send the data and waits for the send allowance signal to become "1" while holding the send request signal at "1". Thereafter, when the output of the data sensing circuit 1-10 becomes "0", the flip-flop 1-12 is set and the send allowance signal becomes "1", so that the processor 6 starts sending. Thus, the driver 1-3 is actuated with the send data sent from the processor 6, and the data is delivered to the coaxial cable 4.

When the processor 6 has sent the data, it brings the send request signal to "0". Thus, the flip-flop 1-12 is reset through the operation of an inverter 1-15, to bring the send allowance signal to "0" and to disable the AND gate 1-14.

The data delivered to the coaxial cable 4 is received by the other transceivers 2, 3. Of them, the transceiver 2 finds the address directed to the processor 7 by examining the head of the received data and transmits the data to the processor 7.

The operations of the transceiver 2 will be described in detail by referring to FIG. 6 as in the case of the transceiver 1.

The transceiver 2 receives the data from the coaxial cable 4 by means of the receiver 1-4. When the reception of the data has been initiated, the output of the data sensing circuit 1-10 becomes "1", and an error checking circuit 1-27 and an address detecting circuit 1-15 are started. Upon deciding that no transmission error is involved in the received address, the error checking circuit 1-27 starts the address detecting circuit 1-15. The address detecting circuit 1-15 compares the address of the received data with the address of the processor 7.

When the addresses agree, the output of the address detecting circuit 1-15 becomes "1". Moreover, since the transceiver 2 is not sending the data of the processor 7, the output of the AND gate 1-13 is "0". Therefore, the output of an AND gate 1-16 becomes "1".

As a result, an AND gate 1-17 is enabled, and the received data is delivered to the processor 7.

Further, the output "1" of the AND gate 1-16 results in setting a flip-flop 1-18. Then, an AND gate 1-19 is enabled, and the received data which is the output of the receiver 1-4 actuates the driver 1-1 and is sent back to the coaxial cable 5.

The turn-back data delivered to the coaxial cable 5 is received by all the other transceivers. As understood from the ensuing description, the turn-back data is significant for only the transceiver 1 which is sending.

Description will be made of the operations of the transceiver 1 again.

The receiver 1-2 receives the turn-back data from the coaxial cable 5, and applies it to a data comparator 1-20. The data comparator 1-20 compares the turn-back data and the send data bit-by-bit, and it provides "0" while they agree and "1" when a disagreement has arisen.

When the sending of the data has begun, a send data sensing circuit 1-21 produces an output "1", which sets a flip-flop 1-24 via a delay circuit 1-22 and an AND gate 1-23. Thus, an AND gate 1-25 is enabled, and the output of the data comparator 1-20 is applied to the AND gate 1-23.

The delay circuit 1-22 serves to validate the output of the data comparator after the address and the error check code thereof in the send data have been sent. The AND gate 1-23 serves to reset the flip-flop 1-24 when the sending has ended and the send allowance signal has become "0".

If the output of the data comparator 1-20 is "0" until the data sending from the processor 6 ends, the data sending is normally completed.

In a case where a bit has changed due to the transmission error on the coaxial cable 4 or 5 or where another processor has simultaneously started the sending of data to cause a contention, the output of the data comparator 1-20 becomes "1".

In this case, a flip-flop 1-29 is reset via an AND gate 1-28, with the result that the output of the AND gate 1-13 becomes "0", and the send allowance signal 11 becomes "0". If, when the send request signal is "1", the send allowance signal becomes "0", the processor 6 decides that the transmission error or the contention of data has developed, and it interrupts the sending of the data. On the other hand, when the output of the AND gate 1-13 becomes "0", the transceiver 1 disables the AND gate 1-14 so as to stop the sending of the data from the processor 6. The AND gate 1-14 is subsequently enabled in a case where the send request signal of the processor 6 becomes "1" and where the send allowance signal is rendered "1" in response thereto.

Figure 7:
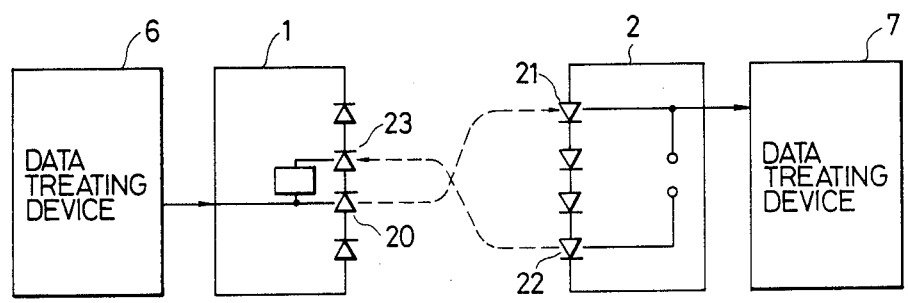
FIG. 7 is a diagram showing an example of an arrangement in the case of using a spacial transmission line.

While, in the foregoing embodiment, the example of communicating among the transceivers by the use of the coaxial cables has been mentioned, the invention is not restricted thereto but may well be realized by employing different transmission means, for example, optical fiber cables or a radio transmission line using light or electric waves. FIG. 7 shows an embodiment of the present invention in the case of utilizing optical space propagation. Each transceiver 1 or 2 comprises a light emitting diode 20 for sending data, a light receiving diode 21 for receiving data, a light emitting diode 22 for sending turn-back data, and a light receiving diode 23 for receiving turn-back data. Light for sending data and light for sending turn-back data have wavelengths of values different from each other, to prevent them from interfering with each other.

A main data transmission line and a turn-back data transmission line may well be constructed in pseudo fashion in such a way that, instead of employing the two coaxial cables as the common transmission lines, the data is modulated at unequal frequencies and are caused to flow to a single coaxial cable.

As set forth above, according to the present invention, when a transceiver sends data to a transceiver in an intended receiving station, the send data is turned back from the transceiver of the intended receiving station, and the send data and the turn-back data are compared, bit-by-bit in the sending side transceiver. Therefore, simultaneously with the end of the sending, a processor on the sending side can acknowledge that the data has properly arrived at a processor in the intended receiving station.

Since the opposite side processor need not send any special data in order to inform the sending side processor of the proper arrival of the data, there is not the possibility of the contention of data resulting from the sending of the special data.

When a transmission error has developed midway of a transmission line, the send data and the turn-back data do not agree, and hence, the development of the transmission error can be immediately detected by the sending side transceiver. Therefore, it becomes unnecessary to send useless subsequent data, and the efficient utilization of transmission lines can be attained. Moreover, the sending side transceiver informs the sending side processor of the development of the transmission error, whereby the sending side processor can immediately start re-sending. Therefore, the period of time in which the data reaches the intended receiving station properly after the starting of the sending can be minimized.

We claim:

1. A data communication system wherein data is communicated among a plurality of stations through first and second transmission lines connected to said stations, wherein each of the stations comprises first means for sending to said first transmission line an address of the station to which data is to be sent along with data in the form of a plurality of sequential signals, second means for receiving sequential data signals and an address sent through said first transmission line, third means for checking to see if an address received by said second means is one directed to the particular station, fourth means for immediately sending to said second transmission line the sequential data signals being received by said second means when an address directed to the particular station has been detected by said third means, and fifth means for comparing each of the sequential signals of the data received from said second transmission line and the sequential signals of the data sent by said first means on said first transmission line to determine the accuracy of transmission of data on said first transmission line.

2. A data communication system according to claim 1, wherein said first means includes means for sending an error check code relating to the address along with the sequential data signals and the address, and said second means of each station includes sixth means for checking to see if the address has been received without any transmission error and for actuating said third means when the absence of a transmission error has been determined.

3. A data communication system according to claim 1 or 2, wherein each station further comprises seventh means for stopping the sending of data to said first transmission line when disagreement between the sequential data signals sent on said first transmission line and the sequential data signals received on said second transmission line has been detected by said fifth means.

4. A data communication system according to claim 1, wherein said sequential data signals are bits which form the data.

5. In a data communication system having a transmission line, and a plurality of stations each of which has a data processor for handling data and a transceiver, in which data is communicated between the stations through the transmission line; a data communication system wherein the transmission line consists of first and second transmission lines, and wherein each transceiver comprises first means for receiving a data sending request signal from said data processor; second means responsive to said first means for applying to said data processor a signal indicating permission for sending data when no data signal is being received at the time said data sending request signal is received; third means for sending to said first transmission line data and an address of a station to which data is to be sent from said data processor, in response to said permission indicating signal; fourth means for receiving data and an address sent through said first transmission line; fifth means for checking to see if the address received by said fourth means is one directed to the particular station; sixth means for sending to said second transmission line the data received by said fourth means when the address directed to the particular station has been detected by said fifth means; and seventh means for comparing the data from said second transmission line and the send data sent by said third means on a bit-by-bit basis.

* * * * *